A. J. LOEPSINGER.
METHOD FOR PREPARING GLASS BULBS FOR AUTOMATIC SPRINKLERS.
APPLICATION FILED JULY 3, 1912.

1,199,089.   Patented Sept. 26, 1916.

UNITED STATES PATENT OFFICE.

ALBERT J. LOEPSINGER, OF PROVIDENCE, RHODE ISLAND, ASSIGNOR TO GENERAL FIRE EXTINGUISHER COMPANY, OF NEW YORK, N. Y., A CORPORATION OF NEW YORK.

METHOD FOR PREPARING GLASS BULBS FOR AUTOMATIC SPRINKLERS.

1,199,089.      Specification of Letters Patent.      Patented Sept. 26, 1916.

Application filed July 3, 1912. Serial No. 707,471.

*To all whom it may concern:*

Be it known that I, ALBERT J. LOEPSINGER, of the city and county of Providence and State of Rhode Island, have invented a certain new and useful Method for Preparing Glass Bulbs for Automatic Sprinklers; and I do hereby declare the following specification, taken in connection with the accompanying drawings, forming a part of the same, to be a full, clear, and exact description thereof.

In an application of even date, Serial No. 707,467, I have shown and described an automatic sprinkler of that type which embodies in its construction a frangible vessel having expansible contents and which is caused to be opened by the expansive or explosive force of the contents of such frangible vessel induced by the action of heat. The preferred form of frangible vessel for use in such an automatic sprinkler consists of a glass bulb with an elongated neck.

The present invention relates to the preparation of such glass bulbs for use in automatic sprinklers of the type referred to, and the invention consists in a novel method of preparing such bulbs, which method is illustrated in the accompanying drawings and will be described in connection therewith.

Figure 3:
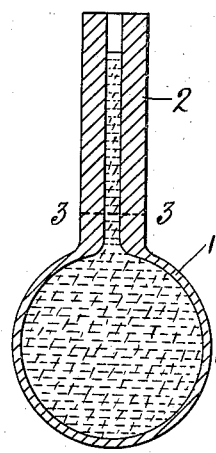
Figure 4:
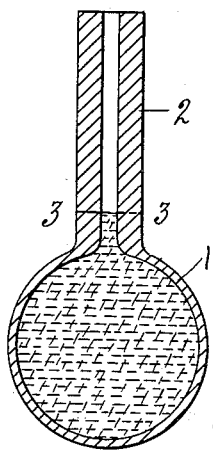
Figure 5:
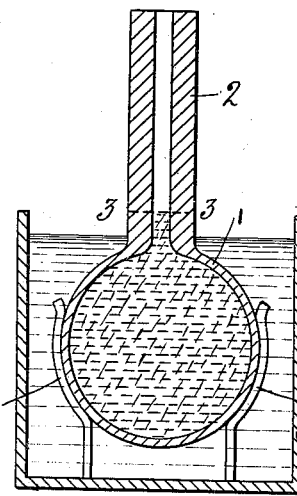

Referring to the drawings, Figures 1 to 6 inclusive are sectional views of a bulb illustrating the several steps of the method hereinafter described, Fig. 5 showing the bulb placed in a receptacle containing liquid.

Figure 1:
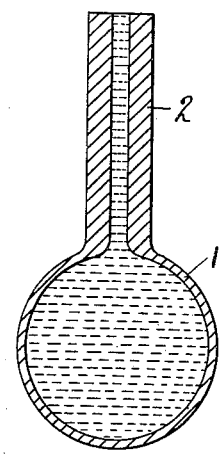
Figure 2:
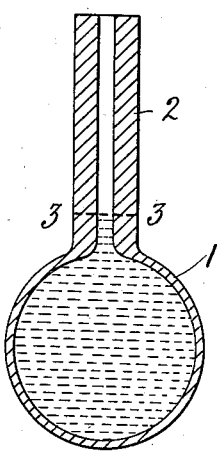

The frangible vessel comprises a glass bulb 1 provided with an elongated neck 2. A sufficient quantity of liquid, preferably water, is placed in the bulb so that when the same is heated up to a desired temperature, as for example 160° Fah., the bulb and its elongated neck will be completely filled with the liquid at such high temperature, as shown in Fig. 1. The bulb and its contents are then cooled to normal temperature, as for example 70° Fah., which will cause a corresponding lowering of the level of the column of liquid in the neck of the bulb, as shown in Fig. 2. A mark indicated by the dotted line 3—3 in Figs. 2 to 6, inclusive, is then made upon the exterior of the neck at the level of the column of liquid therein. A quantity of ammonia or other gas is then introduced into the bulb and the liquid charged therewith. The introduction of the gas raises the level of the column in the neck of the bulb, as shown in Fig. 3, and may even raise the level of the column to such an extent as to cause the liquid to overflow at the open end of the neck. When the desired amount of ammonia or other gas has been thus introduced, a sufficient quantity of the solution is withdrawn from the open end of the neck to bring the level of the column down to the mark which was made upon the neck, that is, down to the line 3—3, as shown in Fig. 4. This leaves the bulb and neck with the proper quantity of ammonia or other solution therein, and so that when the bulb and its contents are at any time thereafter heated up to the high temperature hereinbefore suggested, that is, up to 160° Fah., the bulb and neck will be again entirely filled with the solution.

Figure 6:
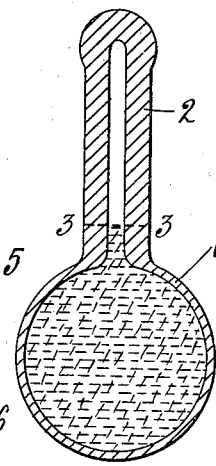

A convenient way of sealing the bulb consists in placing the bulb with the ammonia or other gas solution therein in a receptacle 5 containing some conducting or heat absorbing liquid, such for example as water or mercury, as shown in Fig. 5, and then applying heat to fuse and close the end of the neck and thus hermetically seal the bulb, as shown in Fig. 6. Preferably the receptacle 5 is provided with suitably shaped holding devices 6—6 to receive and hold the bulb, as shown in Fig. 5. By thus placing the bulb and its contents in a receptacle containing a conducting or heat-absorbing liquid the heat applied will be taken up by the surrounding liquid in the receptacle fast enough to prevent the escape of any material quantity of the gas from the bulb during the process of sealing.

By the method of preparing the bulb above described the water or other liquid is introduced into the bulb without the gas and is charged with the ammonia or other gas within the bulb. By regulating the amount of gas introduced into the bulb a definite prescribed ratio of the gas to the liquid may be readily provided.

I make no claim herein to the method of sealing the bulbs above described, the same forming the subject of a divisional application, Serial No. 83,681, filed March 11, 1916.

What I claim as my invention and desire to secure by Letters Patent is:

1. The method of filling and sealing glass bulbs which consists in first filling the bulb full of a liquid at a desired high temperature, then cooling the bulb and its contents to normal temperature, then introducing gas into the liquid until the solution substantially fills the bulb, then withdrawing a quantity of the solution until the level of the solution is brought down to the level of the liquid before the gas was introduced, and then sealing said bulb.

2. The method of filling and sealing glass bulbs which consists in first filling a bulb full of a liquid at a desired high temperature, then cooling the bulb and its contents to normal temperature, then indicating the level of the liquid, then introducing gas into the liquid until the solution substantially fills the bulb, then withdrawing a quantity of the solution until the level of the solution is brought down to such indication, and then sealing said bulb.

3. The method of filling glass bulbs which consists in first filling a bulb with a neck full of a liquid at a desired high temperature, then cooling the bulb and its contents to normal temperature, then making a mark on the neck of the bulb at the level of the liquid, then introducing gas into the liquid until the solution substantially fills the bulb, then withdrawing a quantity of the solution until the level of the solution is brought down to the mark on the neck, and then sealing the neck.

ALBERT J. LOEPSINGER.

Witnesses:
W. H. THURSTON,
J. H. THURSTON.